United States Patent
Novaes (10) Patent No.: US 7,009,971 B2
(45) Date of Patent: Mar. 7, 2006

(54) METHODS AND ARRANGEMENTS FOR MULTICASTING A DATA STREAM AT DIFFERENT DATA RATES TO GROUPS OF SUBSCRIBERS

(75) Inventor: Marcos N. Novaes, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 09/906,938

(22) Filed: Jul. 16, 2001

(65) Prior Publication Data

US 2003/0012194 A1    Jan. 16, 2003

(51) Int. Cl.
*H04L 12/28* (2006.01)
*H04L 12/56* (2006.01)

(52) U.S. Cl. ...................... 370/390; 370/432
(58) Field of Classification Search ............. 370/432, 370/390, 256, 400, 395.31, 401, 231, 351, 370/360, 389, 396, 471; 709/238, 245; 375/340, 375/346, 142, 143, 144, 147
See application file for complete search history.

(56) References Cited

U.S. PATENT DOCUMENTS

| | | | | |
|---|---|---|---|---|
| 5,541,927 A | * | 7/1996 | Kristol et al. ................ | 370/408 |
| 6,418,473 B1 | * | 7/2002 | St. Maurice et al. ........ | 709/231 |
| 6,563,822 B1 | * | 5/2003 | Aoki ........................... | 370/390 |
| 6,567,851 B1 | * | 5/2003 | Kobayashi ................... | 709/228 |
| 6,611,872 B1 | * | 8/2003 | McCanne .................... | 709/238 |
| 6,661,789 B1 | * | 12/2003 | Cankaya et al. ............. | 370/390 |
| 6,791,949 B1 | * | 9/2004 | Ryu et al. .................... | 370/254 |
| 2002/0027894 A1 | * | 3/2002 | Arrakoski et al. ........... | 370/338 |
| 2002/0126698 A1 | * | 9/2002 | Deshpande .................. | 370/467 |
| 2003/0026268 A1 | * | 2/2003 | Navas ......................... | 370/400 |
| 2003/0202506 A1 | * | 10/2003 | Perkins et al. ............... | 370/352 |

OTHER PUBLICATIONS

Chaddha et al., An End to End Software Only Scalable Video Delivery System, Apr. 1995, Computer Systems Laboratory, pp. 1-12.*

* cited by examiner

*Primary Examiner*—Ajit Patel
*Assistant Examiner*—Chirag Shah
(74) *Attorney, Agent, or Firm*—Ference & Associates (57) ABSTRACT

Methods and arrangements for propagating a data stream among a plurality of nodes in a distributed network at different rates. A first group of at least one subscriber node receives a data stream from a publisher node at a first rate, at least one additional group of at least one subscriber node receives a data stream from the publisher node at a second rate. For each of a plurality of frames in the data stream, it is ascertained as to which of the groups of at least one subscriber node are to receive each frame in the data stream. A single multicast transmission of each frame in the data stream is then propagated.

5 Claims, 7 Drawing Sheets

METHODS AND ARRANGEMENTS FOR MULTICASTING A DATA STREAM AT DIFFERENT DATA RATES TO GROUPS OF SUBSCRIBERS

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is specially useful when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes perform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP-IETF Internet Draft; MOSPF-IETF RFC 1584; and PIM—IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal Internet, which was originally derived form the DoD (Department of Defense) ARPAnet and now is the most widely used private network, which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with at least one presently preferred embodiment of the present invention, the problem of distributing data packages to a refined set of subscriber nodes is solved by the provision of a method for organizing a network of router nodes into a distribution structure which is termed a Subsource Addressing Multicast Tree. Contemplated herein are methods and arrangements via which a Subsource Addressing Multicast Tree is used to transmit a single information stream at different data rates to groups of subscribers in a network.

In summary, the present invention provides, in one aspect, a method of propagating a data stream among a plurality of nodes in a distributed network at different rates, the method comprising the steps of: designating one node as a publisher node; designating a plurality of subscriber nodes; designating a first group of at least one subscriber node that is to receive a data stream from the publisher node at a first rate; designating at least one additional group of at least one subscriber node that is to receive a data stream from the publisher node at a second rate; ascertaining, for each of a plurality of frames in the data stream, which of the groups of at least one subscriber node are to receive each frame in the data stream; and propagating a single multicast transmission of each frame in the data stream.

In another aspect, the present invention provides an apparatus for propagating a data stream among a plurality of nodes in a distributed network at different rates, the apparatus comprising: an arrangement for designating one node as a publisher node; an arrangement for designating a plurality of subscriber nodes; an arrangement for designating a first group of at least one subscriber node that is to receive a data stream from the publisher node at a first rate; an arrangement for designating at least one additional group of at least one subscriber node that is to receive a data stream from the publisher node at a second rate; an arrangement for ascertaining, for each of a plurality of frames in the data stream, which of the groups of at least one subscriber node are to receive each frame in the data stream; and an arrangement propagating a single multicast transmission of each frame in the data stream.

Furthermore, in an additional aspect, the present invention provides a program storage device readable by machine, tangibly embodying a program of instructions executable by the machine to perform method steps for propagating a data stream among a plurality of nodes in a distributed network at different rates, the method comprising the steps of: designating one node as a publisher node; designating a plurality of subscriber nodes; designating a first group of at least one subscriber node that is to receive a data stream from the publisher node at a first rate; designating at least one additional group of at least one subscriber node that is to receive a data stream from the publisher node at a second rate; ascertaining, for each of a plurality of frames in the data stream, which of the groups of at least one subscriber node are to receive each frame in the data stream; and propagating a single multicast transmission of each frame in the data stream.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Several other copending and commonly owned U.S. patent applications, filed concurrently herewith, disclose various processes and arrangements whose details may in the role of background information, help provide a better understanding of one or more of the embodiments disclosed and contemplated herein. Accordingly, those applications are hereby fully incorporated by reference as if set forth in their entirety herein, and are as follows (including the tide and application Ser. No. for each one): "Methods And Apparatus for the Propagation Of Multicast Transmissions In A Communications Network" application Ser. No. 09/906,928); "Methods and Apparatus for Updating Subsource Addressing Multicast Routing Records in a Communications Network" application Ser. No. 09/906,597); "Methods and Arrangements for Building a Subsource Address Multicast Distribution Tree Using Traced Routes" application Ser. No. 09/906,936); "Methods and Arrangements for Building a Subsource Address Multicast Distribution Tree Using Point to Point Routing Records" application Ser. No. 09/906,937); "Methods and Arrangements for Building a Subsource Address Multicast Distribution Tree Using Network Bandwidth Estimates" application Ser. No. 09/906,939); "Methods and Arrangements for Dynamically Modifying Subsource Address Multicast Data Distribution Trees" application Ser. No. 09/906,596); "Methods and Arrangements for Monitoring Subsource Addressing Multicast Distribution Trees" application Ser. No. 09/906,593); and "Methods and Arrangements for Establishing a Group Collaboration Session Utilizing Multiple Multicast Distribution Trees" application Ser. No. 90/906,935).

Throughout the present disclosure, various terms are utilized that are generally well-known to those of ordinary skill in the art. However, for the purposes of providing additional clarity, a number of such terms are briefly defined immediately herebelow. (Though one or more of the terms may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates a the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece)of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes with children) of the SAM tree are nodes which are capable of routing SAM messages to any of their descendants. The leaf nodes (nodes without children) are nodes that are final receivers of SMA messages. It is also possible far an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described herebelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine grained addressing scheme, such as the SAM protocol.

Figure 1:
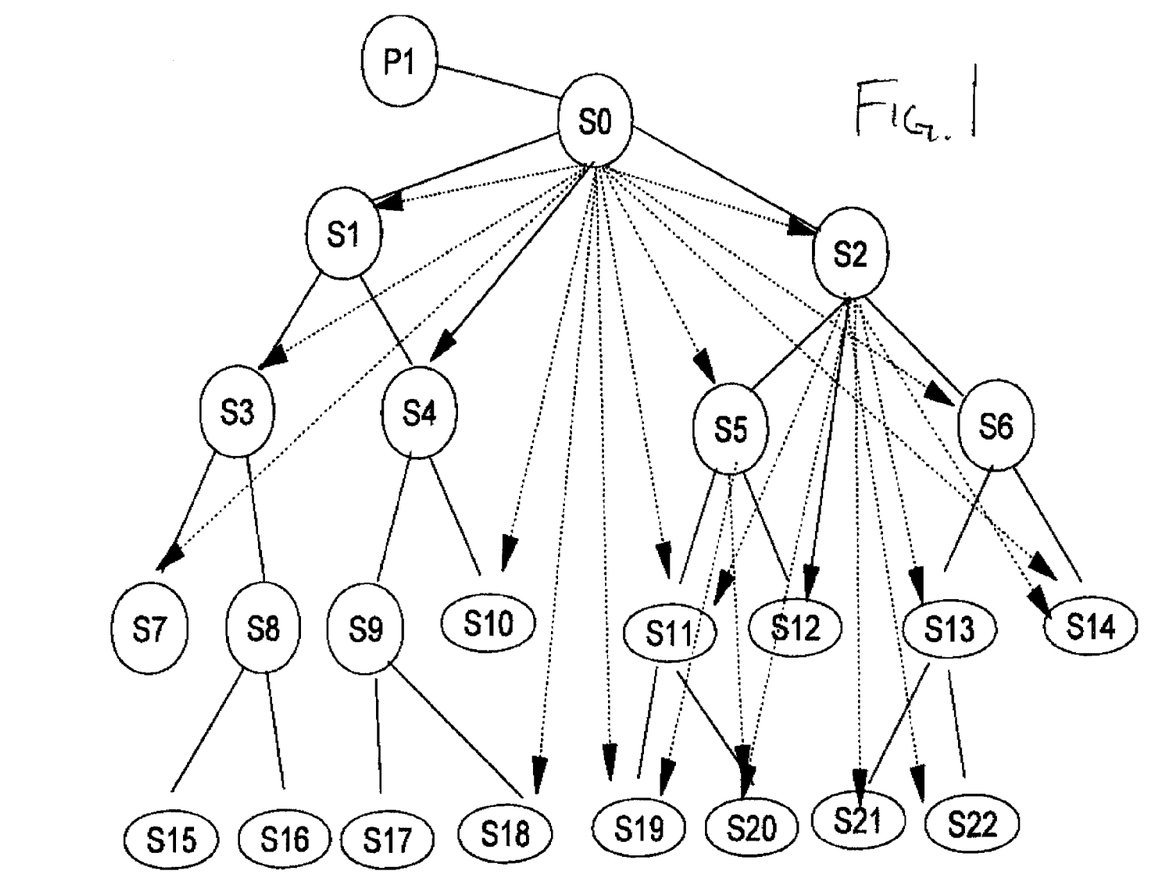
FIG. 1 schematically illustrates a distribution tree and some possible paths for data propagation.

FIG. 1 illustrates a SAM tree and a few of the possible paths for data propagation from the node S0, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment, this is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node P1, which is the publisher of information, and a set of nodes (e.g., S0–S22) which are either direct or indirect descendants of the root node P1. The descendants of the root node P1 can be either the final destination of notification messages or intermediate router nodes. A router node is a node is capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:
  i. the basic point to point package switching operation
  ii. the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which partcipates in a SAM network. Accordingly, each node in a SAM network preferably keeps the following state:
  i. Point to Point Address of the parent node
  ii. Point to Point Address of each child node
  iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:
  <source,predicate> where:
  i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process.
  ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:
  <P1:7777,"X>130">

In another example, the values of the X series indicate unique identifiers which label data items. Therefore, the subscriber could express the desire to receive updates of an item numbered 12345, published by P1 at port 8888, utilizing the following SAM address:
  <P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates; they are handled exactly as network addresses. This allows SAM to be utilized by essentially any type of publisher system, even supporting different lengths in the predicate field.

The disclosure now turns to a particularly useful extension to the SAM message delivery system, in accordance with at least one presently preferred embodiment of the present invention, suitable for applications in which the interest of the subscriber nodes can be mapped into a number of possibly intersecting sets. It is then possible to develop rules for subscriptions which take advantage of the fact that the interest of subscribers intersect. An important objective is to minimize the number of transmissions required to notify two distinct types of subscribers.

This technique is demonstrated herebelow by an example which is related to the multirate transmission of a single data stream. In this example, a publisher node offers a data stream, which is made up of uniform data packets. The subscribers to this data stream can specify the rate with which they want to receive the data packets. For example, a subscriber that wishes to receive all packets subscribes with a rate of 100%, a subscriber which wishes to receive every other packet subscribes with a rate of 50%, a subscriber which wishes to receive every one in four packets subscribers with a rate of 25%, and so forth. Because each subscriber can specify a different rate, the transmission stream is referred to as a multirate stream.

A concrete example in which this capability is specially useful, is the transmission of multimedia streams, which consists of uniform frames of sound and video data. In the present discussion, it is assumed that the encoding of the multimedia stream is such that it is possible for a subscriber to reconstruct the data stream at different rates. The subscribers which receive the multimedia stream at higher rates will be able to reconstruct the stream with better quality than the ones which subscribe to a lower rate. The capability of receiving a stream at different rates is important in applications where the network is composed of links which have different bandwidth, such as the Internet. For example, some subscribers may be connected to the Internet via a high speed line or a low speed modem. The subscribers which are connected via low speed links are not able to receive the high rate stream, because it exceeds the capacity of the network link. But using the technology described in this section, such subscribers would be able to receive a lower rate data stream.

Figure 2:
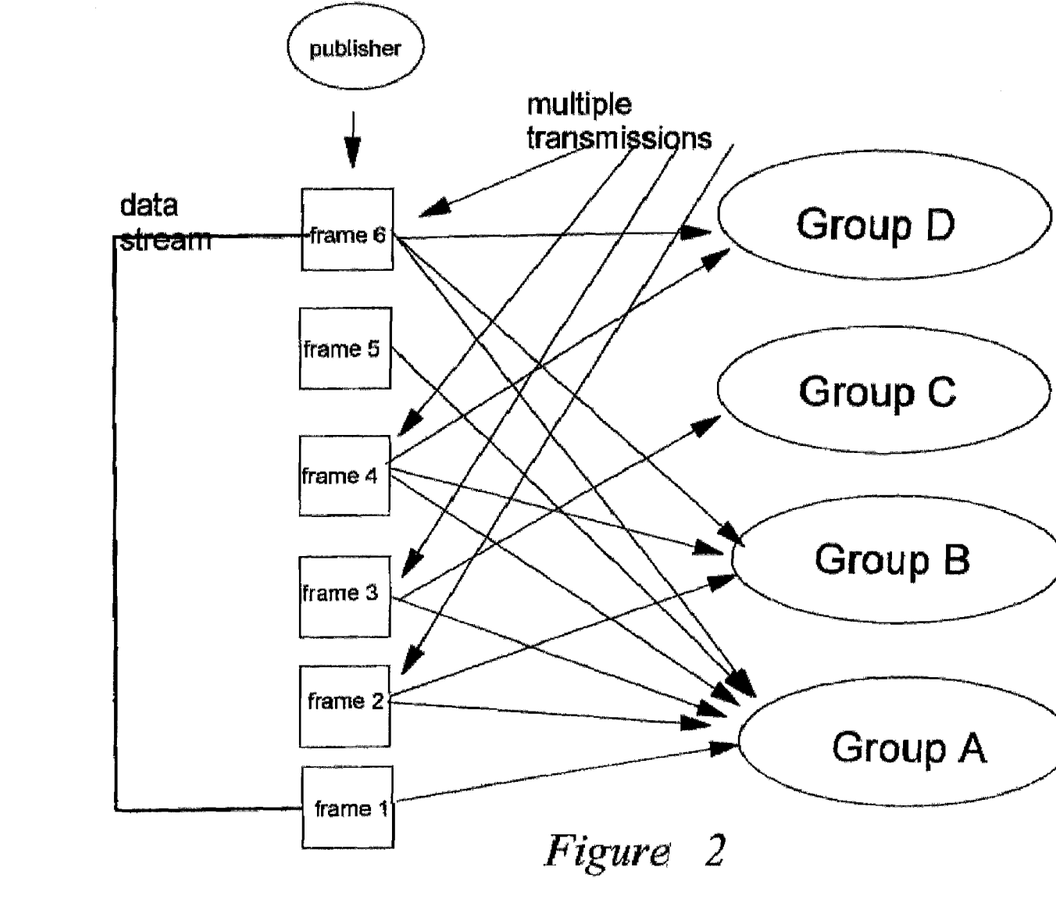
FIG. 2 schematically illustrates the transmission of a data stream to different subscription groups at different rates, using conventional methodology.

Presently, it is believed that no message multicasting technology is able to transmit multirate data stream without generating redundant transmissions. This due to the fact that there tends to be no provision for subscribers to specify a subset of data. The extension to the SAM technology which is discussed herebelow allows such capability. In order to explain the problem solved, one may consider the following example:

With reference to FIG. 2, a publisher node ("publisher") wishes to offer a multimedia stream ("data stream") which is made up of a sequence of data packets (frame 1–frame 6) of essentially the same size. Due to the existence of low speed links in the network, the data stream is offered at the following rates:

Group A: Rate is 100%=subscribers receive all packets (denoted 1:1)

Group B: Rate is 50%=subscribers receive every other packet (denoted 1:2)

Group C: Rate is 33%=subscribers receive one out of three packets (denoted 1:3)

Group D: Rate is 25%=subscribers receive one out of four packets (denoted 1:4)

Utilizing standard multicast technologies, it is necessary to allocate a different multicast address for each of the different rate streams mentioned above. The utilization of different addresses will necessarily result in redundant multicast transmissions of the same data packet. For example, consider the following sequence of transmissions:

i. Frame number 1 (frame 1) needs to be transmitted only to group A;

ii. Frame number 2 (frame 2) needs to be transmitted to groups A and B;

iii. Frame number 3 (frame 3) needs to be transmitted to groups A and C;

iv. Frame number 4 (frame 4) needs to be transmitted to groups A, B and D;

and so forth. It can be noted that frame 12 (not shown) would need to be transmitted to all four groups A–D, generating four separate multicast transmissions from the publisher node. This difficulty is illustrated in FIG. 2. Particularly, as shown in FIG. 2, multiple transmissions are required for frames 2, 3, 4 and 6 (two, two, three and three transmissions, respectively), and it can thus easily be surmised that four transmissions would be required for frame 12.

In contrast to the difficulties discussed above and shown in FIG. 2, at least one presently preferred embodiment of the present invention broadly contemplates the elimination of the multiple transmission problem, by utilizing an extension of the SAM technology designed for multirate data streams.

Preferably, such a multirate data transmission method uses multiple subscriptions in order to multicast a multirate data stream. In this method, the data stream is made up of a sequence of frames labeled "X", indexed by the variable i. Any given frame in the data stream is thus denoted X[i]. The data rate can be mathematically expressed by the mod function:

$$\mod(i, r)$$

The mod which returns the remainder of a division between two integers. In this case, it returns the remainder of the division of the integer i by the integer r. The integer r is used to express the sampling frequency of the data stream. Each subscription group specify a unique value r, which defines the sampling rate of data stream that will be transmitted to the group. The equation above is also used by the publisher in order to decide if a frame should be transmitted to the group. The publisher only transmits a data frame indexed with the integer i for groups that have specified a data rate value r for which:

$$\mod(i,r)=0$$

For example, the interest of the four subscriber groups discussed above can then be mathematically denoted as follows:

$$A=\{X[i]|\mod(i,1)=0\}$$

$$B=\{X[i]|\mod(i,2)=0\}$$

$$C=\{X[i]|\mod(i,3)=0\}$$

$$D=\{X[i]|\mod(i,4)=0\}$$

The interest of group A denoted above can be read as follows: "A is interested in the frames the sequence X[i] for all values i such that mod(i,1)=0". Since the division of an integer by the number 1 always returns a remainder equal to zero, this statement will be true for all values of i, and therefore subscribers which belong in group A are interested in all groups. The subscribers in the group B are only interested in receiving the frames X[i] when the value of mod(i,2)=0. This condition becomes true for all even values of i, and thus B is interested in receiving every other frame, at a rate of 50% as previously described. Similarly, the group C will receive one at every three frames and the subscribers in group D will receive one at every four frames.

A first step in a method presently contemplated is to compute the intersection of the interest groups described above. The intersection of the groups can be visualized by the set diagram in FIG. 3. As shown, group A encompasses all of the groups B, C and D in their entirety, while group B itself encompasses group D in its entirety. Groups B and C, on the other hand, intersect partially with one another, as do groups C and D.

Figure 3:
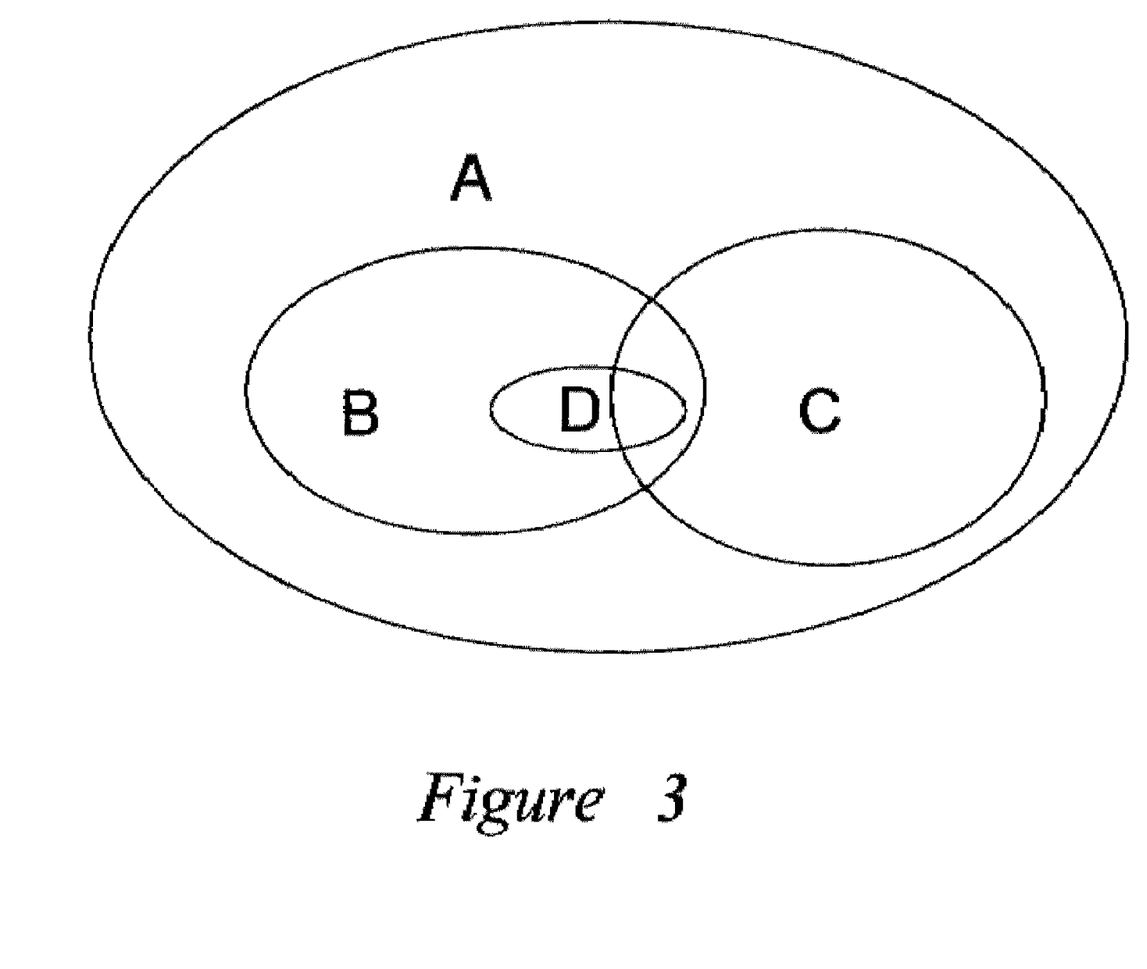
FIG. 3 is a set diagram of four subscription groups.

Thus, in FIG. 3, it can be noticed that the larger set is A, which contains all other sets. This is because subscribers of A receive all the frames X[i]. All other groups receive a subset of the frames, and are therefore shown as a subset of A. The group B includes the even numbered frames and is thus a subset of A. The group C includes the frames which are a multiple of 3, and is also a proper subset of A. The drawing shows an intersection of the groups B and C because the frames X[i] belong to both groups when i is a multiple of 6. Similarly, the set D is a proper subset of both A and B, including the even numbered frames X[i] for which the value of i is a multiple of 4. It is interesting to note that there is a region of intersection of all groups, that represents the frames X[i] for which i is a multiple of 12.

Though the diagram shown in FIG. 3 is provided as a visualization, it will essentially, in accordance with a preferred embodiment of the present invention, not be used directly in a computer method which computes the intersection of the interest groups. Preferably, the computer method utilizes the second mod argument in the group definitions above, and involves calculating which groups are satisfied by a specific value of i, for each value of i in the range that extends from 1 to the minimum common multiple of the second mod argument. The result of this calculation is a string of letters which represent the groups that are satisfied by specific value of i.

In the present example, the second arguments for groups {A,B,C,D} are {1,2,3,4}, respectively. The minimum common multiple of all second arguments is therefore 12. The method then consists of calculating which groups are satisfied by the values of i that range from 1 to 12. For example, when the value of "i" is 1, only the group A is satisfied, and so the output for the calculation X[1] is the string A. When the value of i is 2, both the groups A and B are satisfied, and so the result for X[2] is the string "AB". The following are therefore the results for the values of i that range from 1 to 12:

X[1]="A"
X[2]="AB"
X[3]="AC"
X[4]="ABD"
X[5]="A"
X[6]="ABC"
X[7]="A"
X[8]="ABD"
X[9]="AC"
X[10]="AB"
X[11]="A"
X{12]="ABCD"

Figure 4:
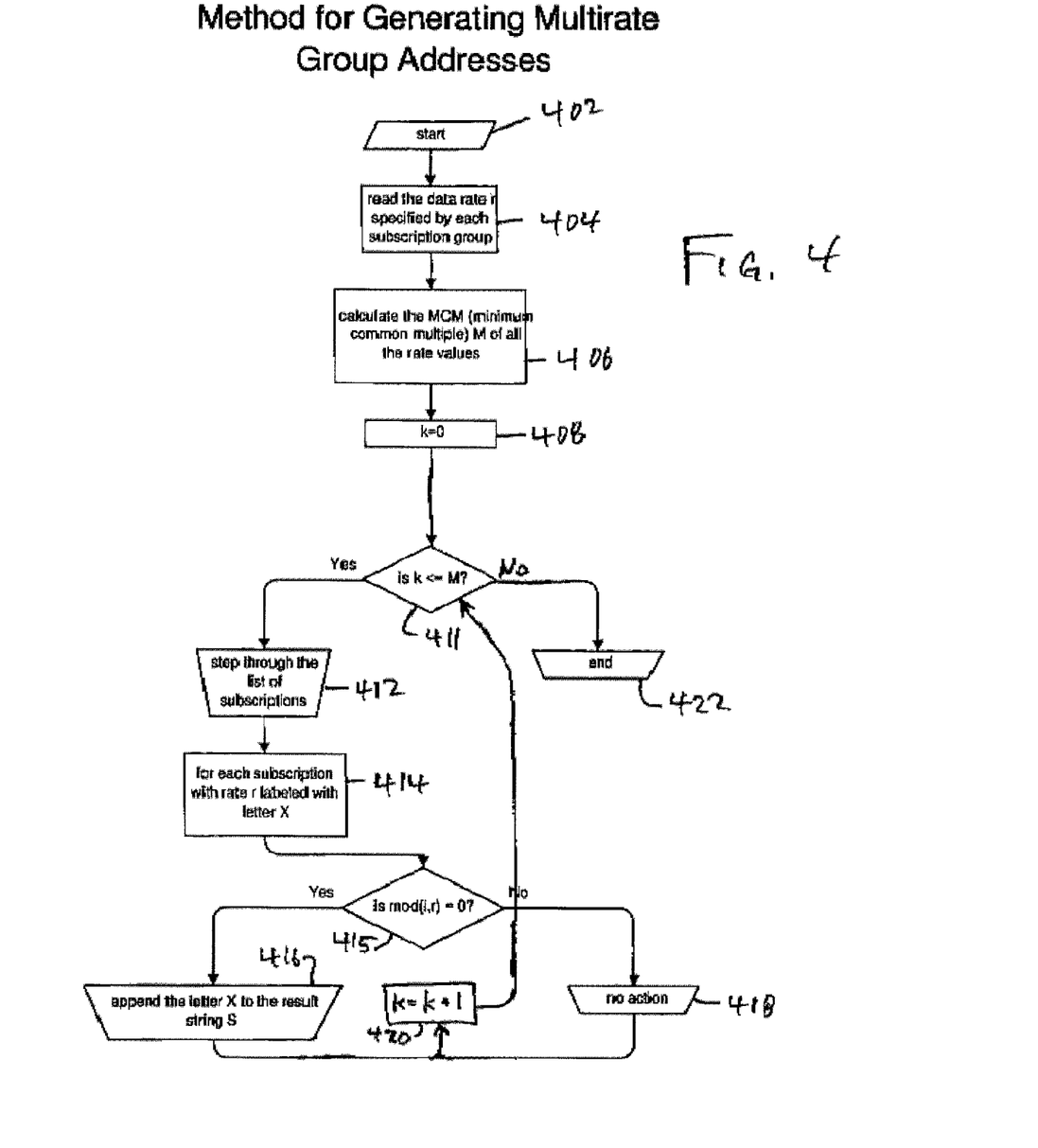
FIG. 4 schematically illustrates a method for generating multirate group addresses.

This calculation concludes the first phase of the multirate data transmission method. A flowchart representing this phase, which may be termed "Generation of Multirate Group Addresses", is shown in FIG. 4. As shown, the process starts at 402 and, at 404, the data rate r specified by each subscription group is read. At 406, the minimum common multiple M of all of the rate values is calculated. At 408, k is established at 0. At 411, it is queried as to whether k is less than or equal to M. If yes, then at 412 the list of subscriptions is stepped through and, at 414, it is established that for each subscription with rater r labeled with letter X, the query at 415 will apply, that is, "is mod(i,r)=0?" If yes, then at 416 the letter X is appended to the result string S and at 420 k is incremented by 1, with the process then returning to 411.

If the answer to the query at 415 is "no", then at 418 it is established that no action will be taken and the process continues at 420.

If the answer to the query at 411 is "no", then at 422 the process ends.

A second phase of the presently discussed method preferably includes scanning the list above, and generating one unique predicate for each unique string above. In this case, there are 6 distinct strings: {A,AB,AC,ABD,ABC,ABCD}.

The publisher node and the subscribers now preferably utilize the following method for making SAM subscriptions which utilize these strings as part of the predicate. Such a method preferably utilizes multiple subscriptions, where each subscriber needs to subscribe to each string of the set above which contains the letter of its interest group.

For example, the subscribers in group A need to subscribe to all 6 strings, using predicates such as: X=A, X=AB, X=AC, and so forth. The subscribers which have the lowest rate are the members of interest group D, and these only have to subscribe to the group "ABCD". The following table is preferably used by the subscribers from each group in making a SAM subscription:

members of group A make separate subscriptions for the predicates: "A, AB, AC, ABD, ABC, ABCD"
members of group B make separate subscriptions for the predicates: "AB,ABD, ABC, ABCD"
members of group C make separate subscriptions for the predicates: "AC, ABC, ABCD"
members of group D make a single subscription for the predicates: "ABCD"

Figure 5:
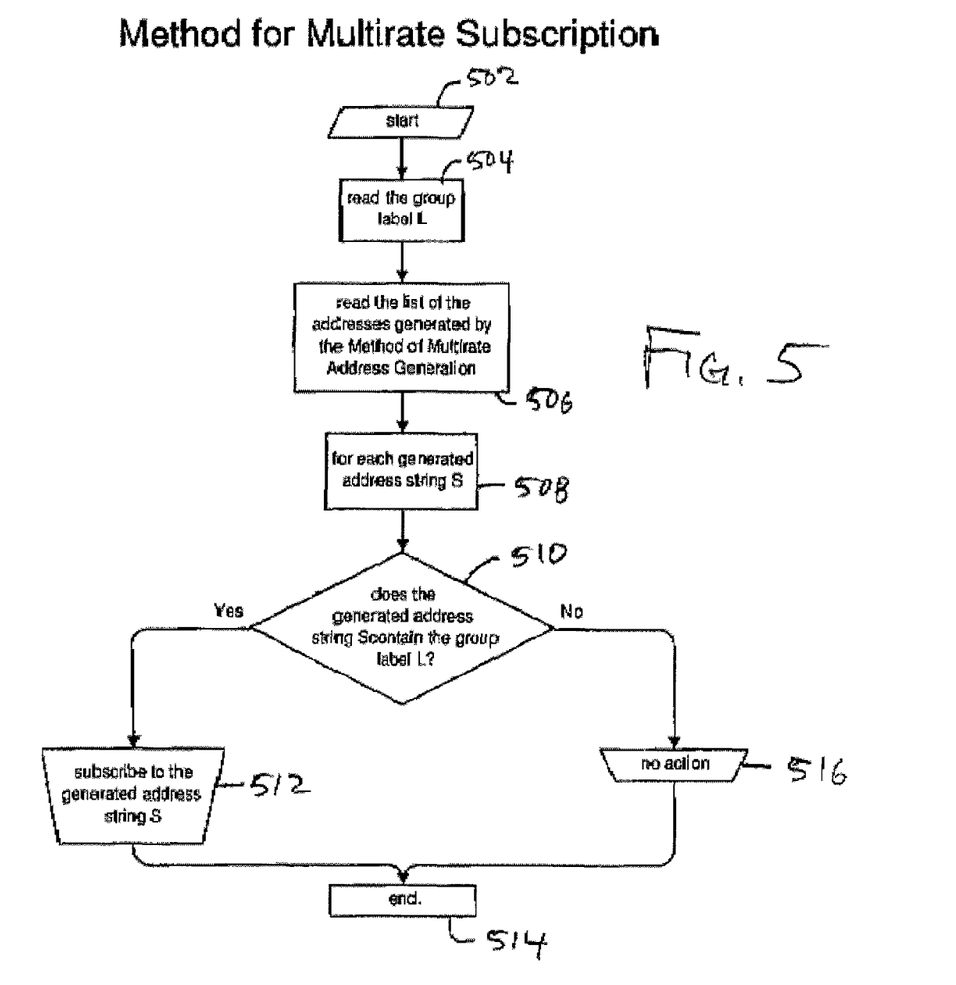
FIG. 5 schematically illustrates a method for multirate subscription.

The method used by subscribers for making the multirate subscriptions is shown in FIG. 5. As shown in FIG. 5, the process starts at 502 and then, at 504, the group label L is read. At 506, the list of the addressees generated by the aforedescribed method of multirate address generation is read. At 508, it is established that for each generated address string S, the query at 510 will apply, i.e., "Does the generated address string S contain the group label L?". If yes, then at 512 a subscription to the generated address string S will be realized and the process will end at 514. If no, then at 516 no action will be taken and the process will end at 514.

Figure 6:
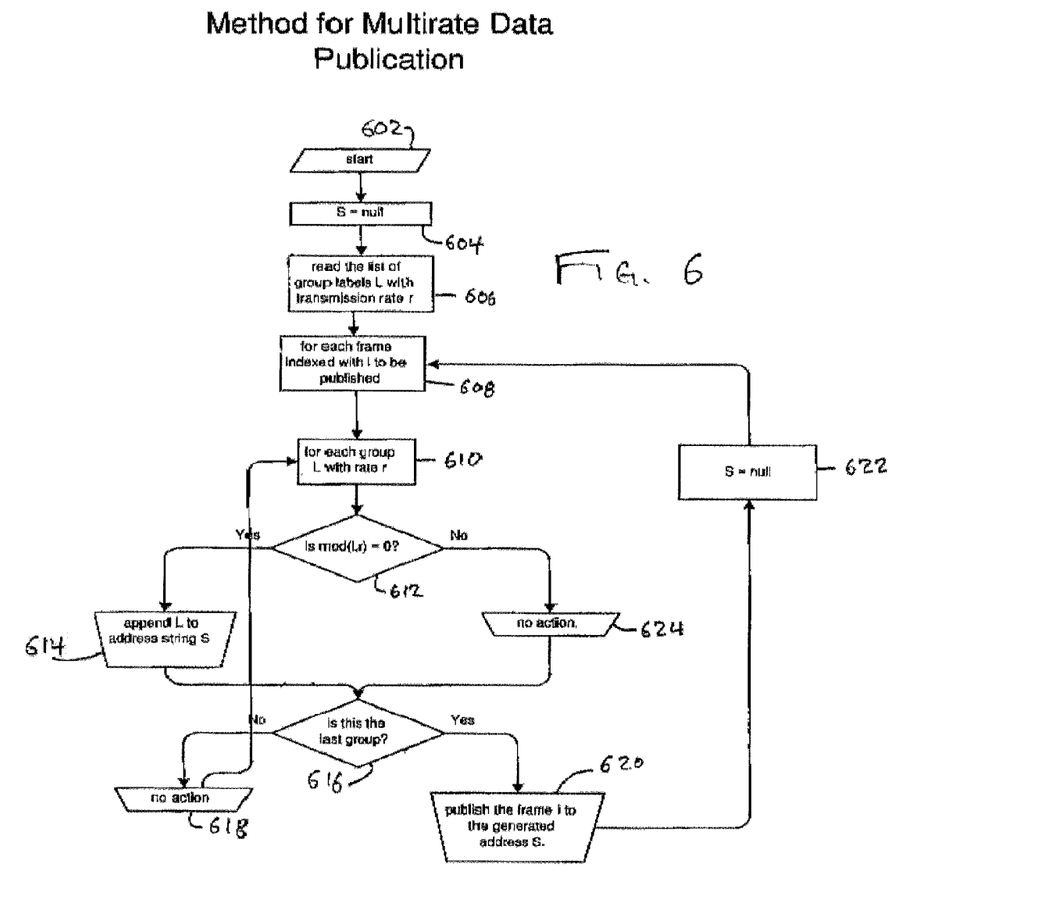
FIG. 6 schematically illustrates a method for multirate data publication.

Preferably, the method utilized by the publisher node to publish a given frame X[i] involves computing the groups for which the value of i satisfies the equation:

$$\mod(i,r)=0$$

where,
i is the index of the data frame
r is the frequency at which the data frame is to be transmitted for that subscription group.

For every subscription group for which the equation above evaluates to 0, the letter which represents the group is appended to a string. The resulting string is then used to make a single multicast transmission of the data frame. This method is illustrated in FIG. 6. As shown, the process starts at 602 and then S is assigned as being null. At 606, the list of group labels with the transmission rate r is read. For each frame indexed with i to be published (608), and for each group L with rate r (610), it is queried at 612 as to whether mod(i,r)=0. If yes, then at 614 L is appended to address string S but if no, then at 624 no action is taken. In both cases, it is then queried at 616 if this is the last group. If no, then no action is taken (618) and the process continues at 610. If yes, then at 620 the frame i is published to the generated address S and, at 622, S is reassigned as being null. The process then continues at 608.

It should be noted that it is possible to utilize any other function or equation, other than "mod(i,r)=0" to map a specific frame index to a combination of subscription groups, and that the use of such equations does not deviate from the spirit of the present invention.

Figure 7:
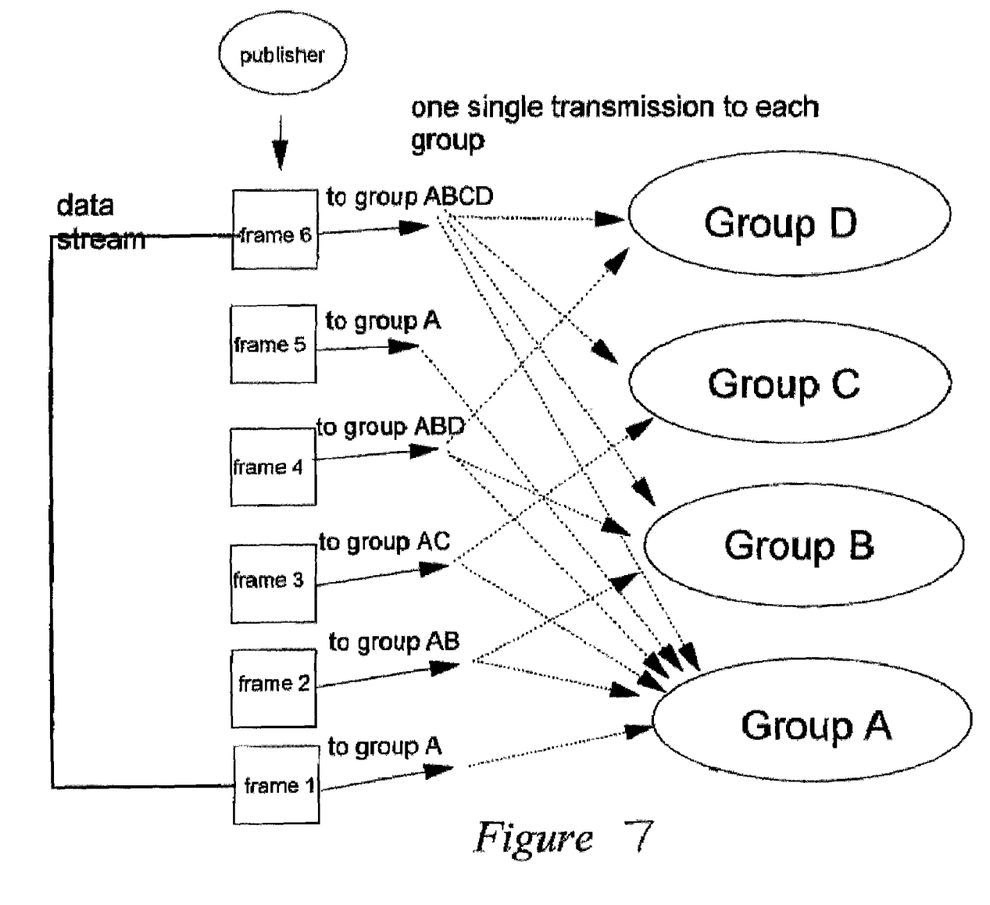
FIG. 7 schematically illustrates the improved transmission of a data stream to different subscription groups at different rates.

FIG. 7 illustrates the multirate addressing scheme created for the sample subscription groups in the example described above, thus illustrating a distinct improvement in comparison with FIG. 2. It should be noted that only one outbound transmission per frame is necessary at the publisher node, as represented by the solid arrows. The dotted arrows represent the SAM distribution to each subscriber group A, B, C, D.

It is to be understood that the present invention, in accordance with at least one presently preferred embodiment, includes an arrangement for designating one node as a publisher node, an arrangement for designating a plurality of subscriber nodes; an arrangement for designating a first group of at least one subscriber node that is to receive a data stream from the publisher node at a first rate, an arrangement for designating at least one additional group of at least one subscriber node that is to receive a data stream from the publisher node at a second rate, an arrangement for ascertaining, for each of a plurality of frames in the data stream, which of the groups of at least one subscriber node are to receive each frame in the data stream, and an arrangement propagating a single multicast transmission of each frame in the data stream. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of propagating a data stream among a plurality of nodes in a distributed network at different rates, said method comprising the steps of:
   designating one node as a publisher node;
   designating a plurality of subscriber nodes;
   designating a first group of at least one subscriber node that is to receive a data stream from said publisher node at a first rate;
   designating at least one additional group of at least one subscriber node that is to receive a data stream from said publisher node at a second rate;
   ascertaining, for each of a plurality of frames in the data stream, which of the groups of at least one subscriber node are to receive each frame in the data stream; and
   propagating a single multicast transmission of each frame in the data stream.

2. The method according to claim 1, wherein:
   said ascertaining step comprises establishing predicates each listing at least one group of at least one subscriber node, the predicates collectively indicating the possible sets of at least one group of at least one subscriber node to which all frames in the data set may each be propagated;
   said method further comprising the step of prompting each subscriber node to subscribe to at least one of said predicates, based on the group or groups with which each subscriber node is associated.

3. An apparatus for propagating a data stream among a plurality of nodes in a distributed network at different rates, said apparatus comprising:
   an arrangement for designating one node as a publisher node;
   an arrangement for designating a plurality of subscriber nodes;
   an arrangement for designating a first group of at least one subscriber node that is to receive a data stream from said publisher node at a first rate;
   an arrangement for designating at least one additional group of at least one subscriber node that is to receive a data stream from said publisher node at a second rate;
   an arrangement for ascertaining, for each of a plurality of frames in the data stream, which of the groups of at least one subscriber node are to receive each frame in the data stream; and
   an arrangement propagating a single multicast transmission of each frame in the data stream.

4. The apparatus according to claim 1, wherein:
   said ascertaining arrangement is adapted to establish predicates each listing at least one group of at least one subscriber node, the predicates collectively indicating the possible sets of at least one group of at least one subscriber node to which all frames in the data set may each be propagated;
   said apparatus further comprises the step prompting each subscriber node to subscribe to at least one of said predicates, based on the group or groups with which each subscriber node is associated.

5. A program storage device readable by machine, tangibly embodying a program of instructions executable by the machine to perform method steps for propagating a data stream among a plurality of nodes in a distributed network at different rates, said method comprising the steps of:
   designating one node as a publisher node;
   designating a plurality of subscriber nodes;
   designating a first group of at least one subscriber node that is to receive a data stream from said publisher node at a first rate;
   designating at least one additional group of at least one subscriber node that is to receive a data stream from said publisher node at a second rate;
   ascertaining, for each of a plurality of frames in the data stream, which of the groups of at least one subscriber node are to receive each frame in the data stream; and
   propagating a single multicast transmission of each frame in the data stream.

* * * * *